US009429070B2

(12) United States Patent
Kahn et al.

(10) Patent No.: US 9,429,070 B2
(45) Date of Patent: Aug. 30, 2016

(54) TURBINE ENGINE STARTING SYSTEM

(71) Applicants: William C. Kahn, Denton, TX (US); Steve J. Polansky, Colleyville, TX (US); Christopher G. Wehrwein, Little Elm, TX (US)

(72) Inventors: William C. Kahn, Denton, TX (US); Steve J. Polansky, Colleyville, TX (US); Christopher G. Wehrwein, Little Elm, TX (US)

(73) Assignee: PACCAR Inc, Bellevue, WA (US)

( * ) Notice: Subject to any disclaimer, the term of this patent is extended or adjusted under 35 U.S.C. 154(b) by 791 days.

(21) Appl. No.: 13/782,609

(22) Filed: Mar. 1, 2013

(65) Prior Publication Data

US 2014/0245727 A1 Sep. 4, 2014

(51) Int. Cl.
| | |
|---|---|
| *F02C 7/27* | (2006.01) |
| *F02C 7/00* | (2006.01) |
| *F02C 7/277* | (2006.01) |
| *F02C 6/20* | (2006.01) |
| *B60K 3/04* | (2006.01) |

(52) U.S. Cl.
CPC . *F02C 7/00* (2013.01); *F02C 6/20* (2013.01); *F02C 7/27* (2013.01); *F02C 7/277* (2013.01); *B60K 3/04* (2013.01)

(58) Field of Classification Search
CPC ............ F02C 7/27; F02C 7/277; F02C 6/20; B60K 3/04
See application file for complete search history.

(56) References Cited

U.S. PATENT DOCUMENTS

| | | | | | |
|---|---|---|---|---|---|
| 2,535,488 | A | * | 12/1950 | Dros | F02C 3/36 290/2 |
| 2,582,848 | A | * | 1/1952 | Price | B64C 21/025 237/11 |
| 2,711,071 | A | * | 6/1955 | Frankel | F01D 25/20 184/6.3 |
| 2,970,440 | A | * | 2/1961 | Dmitroff | B64C 27/12 60/328 |
| 3,595,016 | A | * | 7/1971 | Stockton | F02C 7/36 475/205 |
| 3,819,233 | A | * | 6/1974 | Barnard | B60T 17/02 303/1 |
| 4,068,468 | A | | 1/1978 | Wood | |
| 4,885,909 | A | | 12/1989 | Rodgers | |
| 4,916,893 | A | | 4/1990 | Rodgers | |
| 5,184,456 | A | | 2/1993 | Rumford | |
| 6,644,033 | B2 | | 11/2003 | Daggett | |
| 6,735,952 | B2 | | 5/2004 | Olsen | |
| 7,418,821 | B2 | | 9/2008 | Butt | |

FOREIGN PATENT DOCUMENTS

GB 1530331 10/1978

* cited by examiner

*Primary Examiner* — Nathaniel Wiehe
*Assistant Examiner* — Michael Quandt
(74) *Attorney, Agent, or Firm* — Christensen O'Connor Johnson Kindness PLLC

(57) ABSTRACT

System and method for starting a turbine engine are disclosed. These systems and methods for starting a turbine engine may be located on a vehicle, such as such as a Class 8 vehicle, equipped with a turbine engine as the prime mover or as a generator in a hybrid powertrain. In that regard, a fluid forcing device may be employed to start the turbine engine, such as an electric pump/compressor. The fluid forcing device may already be located on the vehicle for other purposes, and can include an electrically powered steering pump (also referred to as an electric pump) or an electrically powered air brake compressor (also referred to as an electric compressor). In order to start the turbine engine, the output of the electric pump/compressor drives an associated fluid circuit, which in turn, supplies fluid over a portion of the turbine shaft, wheel or scroll in order to impart rotational motion thereto. The rotational motion imparted to the turbine shaft, wheel or scroll aims to start the turbine engine. Once started, the output of the electric pump/compressor is either inhibited or redirected to power other devices, such as one or more vehicle accessories (e.g., steering gear, air brakes, power take off (PTO), air conditioner, etc).

14 Claims, 4 Drawing Sheets

TURBINE ENGINE STARTING SYSTEM

BACKGROUND

Conventional vehicles, including medium and heavy duty trucks, employ a number of different propulsion mechanisms to propel the vehicle. In the past, the most popular propulsion mechanism for such vehicles was the internal combustion piston engine of the compression ignition type (e.g., diesel engines). This was mainly due to its performance ratings in categories such as torque production, fuel economy, and reliability, among others.

The increasing demand to improve fuel economy, eliminate emissions, and reduce noise levels has driven the automotive market to develop a variety of new propulsion mechanisms. As an alternative to the traditional internal combustion piston engine powertrain, the industry has developed a hybrid electric system powered by an electric traction motor(s) and an internal combustion piston engine. During varying driving conditions, hybrid electric vehicles (HEVs) will alternate between the separate power sources, depending on the most efficient manner of operation of each source.

The trucking industry is continually looking for new propulsion mechanisms. Recently, several companies in the trucking industry are contemplating the use of gas turbine engines for over-the-road trucks or the like. In fact, the Leyland trucking company in the late 1960's and early 1970's employed a gas turbine engine as the prime mover in at least one of their trucks. By the late 1970's, other companies were exploring the possibility of employing gas turbine engines as prime movers. One such company was Mack Trucks, which experimented with gas turbine engines, in the concept vehicle WS760LST Gas Turbine Truck. This truck was constructed on the basis of a serial cabover model WA CruiseLiner, but was equipped with a gas turbine model GT601 with power of approximately 550 hp.

With the advent of employing turbine engines in medium and heavy trucks, a turbine starter is needed. Embodiments of the present disclosure are directed to such turbine starters and others.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure a vehicle is provided. The vehicle includes a turbine engine, a steering system including an electrically driven steering pump and a steering gear, and a fluid circuit coupled to the electrically driven steering pump and receiving a fluid therefrom. In some embodiments, the fluid circuit is further coupled to the steering gear and the turbine engine for supplying fluid thereto. The vehicle also includes a control valve coupled to the fluid circuit. In some embodiments, the control valve is configured to selectively direct fluid from the electrically driven steering pump to either the steering gear or the turbine engine in response to a control signal.

In accordance with another aspect of the present disclosure, a vehicle is provided. The vehicle includes a turbine engine, a brake system including an electrically driven gas compressor and a compressed gas tank, and a gas circuit coupled to the electrically driven gas compressor and receiving a gas therefrom. The gas circuit in some embodiments is coupled to the compressed gas tank and the turbine engine for supplying fluid thereto. A control valve is also included and is coupled to the gas circuit. The control valve in some embodiments is configured to selectively direct gas from the electrically driven gas compressor to either the compressed gas tank or the turbine engine in response to a control signal.

In accordance with another aspect of the present disclosure, a vehicle is provided. The vehicle includes a turbine engine, an accessory system including an electric means for forcing a fluid and an accessory component, and a fluid circuit coupled to the electric means for forcing a fluid. The fluid circuit in some embodiments is further coupled to the turbine engine and the accessory component for supplying fluid thereto. A control valve is also provided and is coupled to the fluid circuit. The control valve in some embodiments has a first position configured to direct fluid from the electric means for forcing a fluid to the turbine engine and a second position configured to direct fluid from the electric means for forcing a fluid to the accessory component. The vehicle further includes a controller configured to transition the control valve from the first position to the second position.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
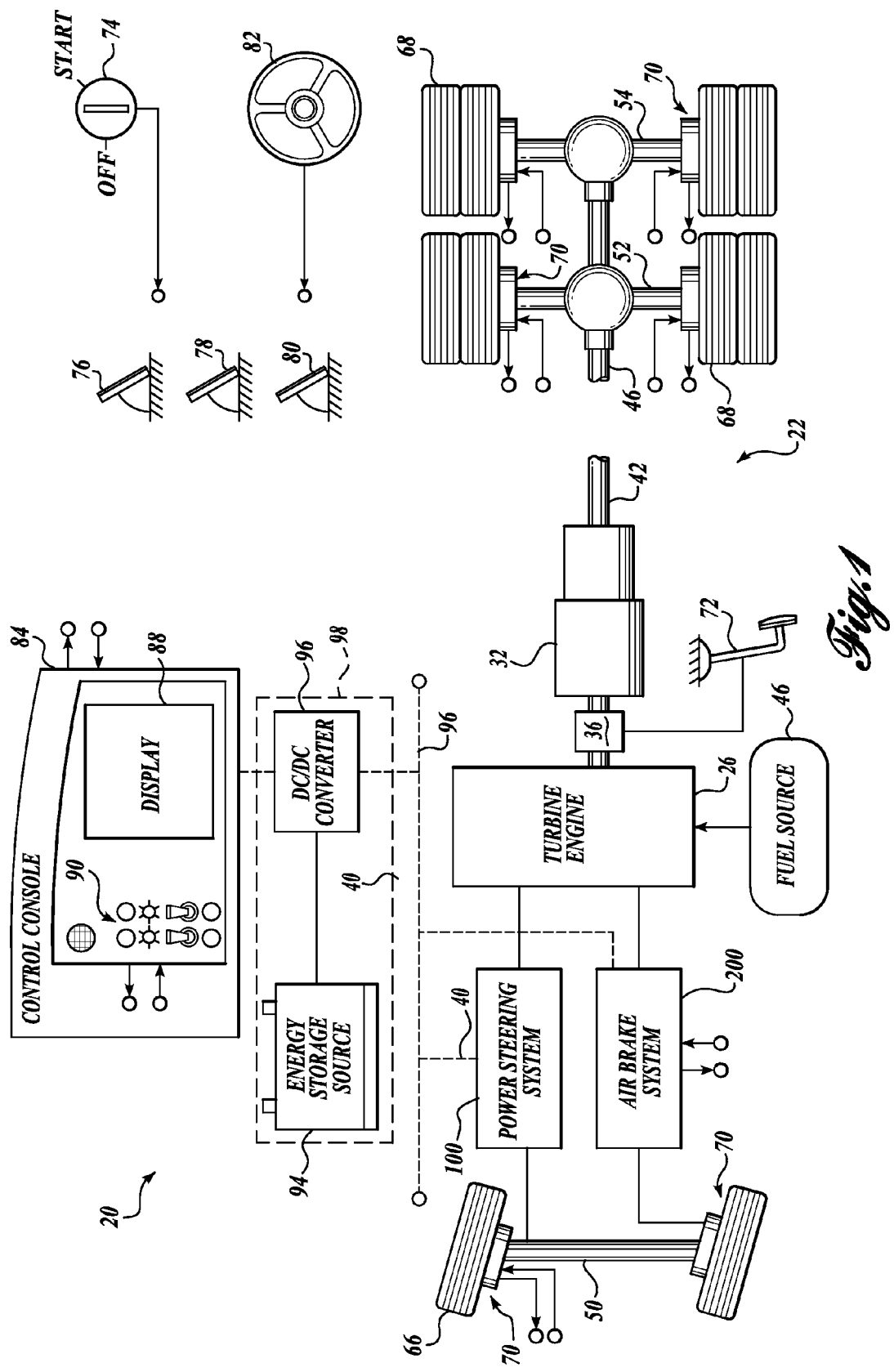
FIG. 1 is a schematic diagram of one suitable vehicle employing one example of a turbine starting system formed in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Prior to discussing the details of various aspects of the present disclosure, it should be understood that the following description includes sections that are presented largely in terms of logic and operations that may be performed by conventional electronic components. These electronic components may be grouped in a single location or distributed over a wide area. It will be appreciated by one skilled in the art that the logic described herein may be implemented in a variety of configurations, including but not limited to, hardware, software, and combinations thereof. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

The following description sets forth one or more examples of a system and method for starting a turbine engine. These systems and methods for starting a turbine engine may be located on a vehicle, such as such as a Class 8 vehicle, equipped with a turbine engine as the prime mover or as a generator in a hybrid powertrain. In that regard, some examples described herein employ a fluid forcing device, such as an electric pump/compressor, already located on the vehicle, such as an electrically powered steering pump (also referred to as an electric pump) or an electrically powered air brake compressor (also referred to as an electric compressor), to start the turbine engine.

As will be described in more detail below, in order to start the turbine engine, the output of the electric pump/compressor in some embodiments drives an associated fluid circuit, which in turn, supplies fluid over a portion of the turbine wheel or scroll in order to impart rotational motion thereto. The rotational motion imparted to the turbine wheel or scroll aims to start the turbine engine. Once started, the output of the electric pump/compressor is either inhibited or redirected to power other devices, such as one or more vehicle accessories (e.g., steering gear, air brakes, power take off (PTO), air conditioner, etc). In one embodiment, the electric pump is the vehicle's power steering pump. In another embodiment, the electric air compressor is the vehicle's air compressor that powers the air brakes, etc.

Although exemplary embodiments of the present disclosure will be described hereinafter with reference to a heavy duty truck, it will be appreciated that aspects of the present disclosure have wide application, and therefore, may be suitable for use with many other types of vehicles, including but not limited to light & medium duty vehicles, passenger vehicles, motor homes, buses, commercial vehicles, marine vessels, etc. Accordingly, the following descriptions and illustrations herein should be considered illustrative in nature, and thus, not limiting the scope of the present invention, as claimed.

FIG. 1 schematically shows a vehicle 20, such as a Class 8 tractor, that comprises a powertrain system 22, a power steering system 100 and an air brake system 200. In the embodiment shown in FIG. 1, the powertrain 22 includes an internal combustion engine in the form of a turbine engine 26, a transmission 32, and an optional clutch assembly 36. The transmission 32 may be a manual transmission, an automated manual transmission, or an automatic transmission that includes multiple forward gears and a reverse gear operatively connected to an output shaft 42. The optional clutch assemblies 36 may be positioned between the turbine engine 26 and the transmission 32 to selectively engage/disengage the turbine engine 26 from the transmission 32.

The powertrain 22 also includes a fuel source 46 or the like that stores any suitable combustive fuel, such as gasoline, diesel, natural gas, alcohol, propane, hydrogen, etc. In use, the turbine engine 26 receives fuel from the fuel source 46 and converts the energy of the fuel into output torque as conventionally known. The output torque of the turbine engine 26 is converted via the transmission 32 into rotation of the output shaft 42.

The vehicle 20 also includes at least two axles such as a steer axle 50 and at least one drive axle, such as axles 52 and 54. The output shaft 42 of the transmission 32, which may include a vehicle drive shaft 46, is drivingly coupled to the drive axles 52 and 54 for transmitting the output torque generated by the turbine engine 26 to the drive axles 52 and 54. The steer axle 50 is operatively coupled to the power steering system 100. The steer axle 50 supports corresponding front wheels 66 and the drive axles 52 and 54 support corresponding rear wheels 68, each of the wheels having service brake components 70. In some embodiments, the service brake components include air brake components of the air brake system 200, such as compressed air supply/return lines, brake chambers, etc. The service brake components 70 may also include wheel speed sensors, electronically controlled pressure valves, and the like, to effect control of the vehicle braking system.

The vehicle 20 may also include operator control inputs, such as a clutch pedal 72 (in some manual systems), an ignition or start switch 74, an accelerator pedal 76, a service brake pedal 78, a parking brake 80, and a steering wheel 82 to effect turning of the front wheels 66 of the vehicle 20. The vehicle 20 may further include a cab mounted operator interface, such as a control console 84, which may include any of a number of output devices 88, such as lights, graphical displays, buzzers, speakers, gages, and the like, and various input devices 90, such as toggle switches, push button switches, potentiometers, or the like.

To provide power to the control console 84, a DC/DC converter 92 is connected to an energy storage source 94 and a high voltage bus 96 of a power system 98. The DC/DC converter 92 reduces the voltage it receives, and outputs power at this lower voltage to the control console. The D/C to D/C converter 96 can output power to other electrical devices on the vehicle, such as one or more electric motors associated with the steering pump and/or air brakes compressor, as will be described in more detail below. The DC/DC converter may also condition the power prior to directing it to the low voltage electrical devices.

The vehicle 20 depicted in FIG. 1 represents one of the possible applications for the systems and methods of the present disclosure. It should be appreciated that aspects of the present disclosure transcend any particular type of land or marine vehicle employing a turbine engine powertrain. Additionally, it will be appreciated that aspects of the present disclosure may be suitable for use in vehicles employing series hybrid powertrains in which the turbine engine is utilized as a generator.

Figure 2:
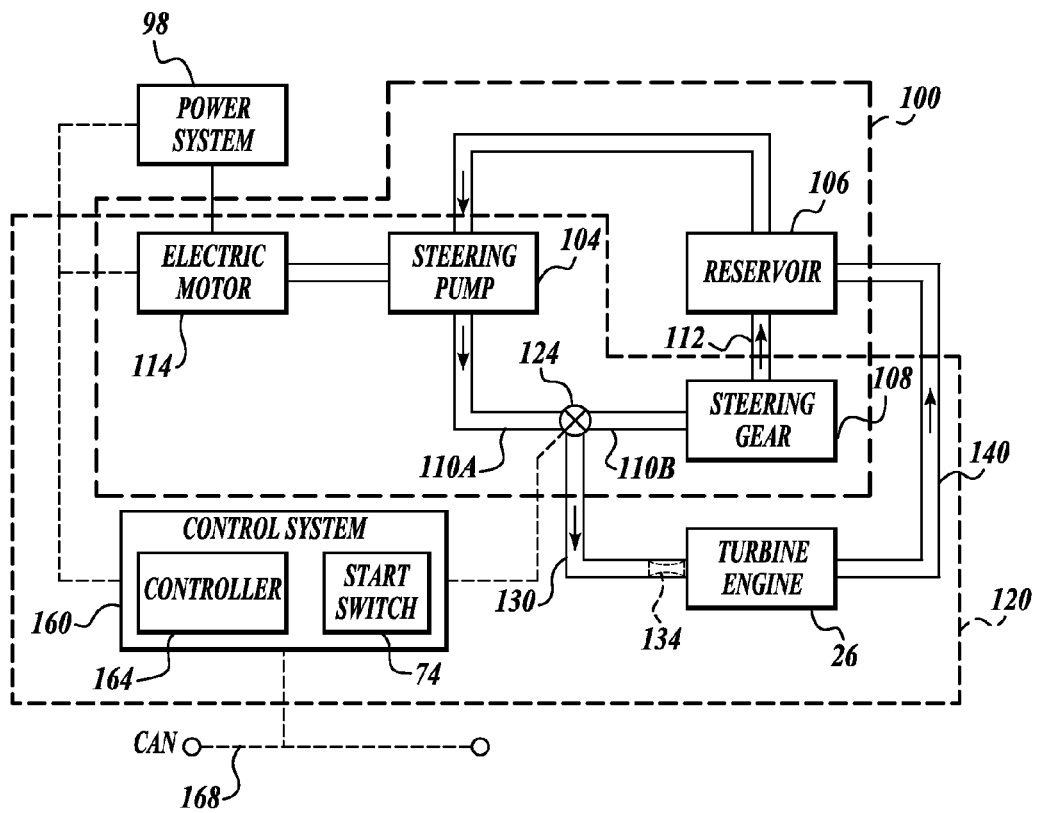
FIG. 2 is a schematic diagram of one embodiment of a turbine starting system formed in accordance with aspects of the present disclosure.

Referring now to FIG. 2, there is shown a schematic view of one embodiment of a turbine starting system, generally designated 120, formed in accordance with aspects of the present disclosure. The starting system 120 is suitable for use in a vehicle, such as the vehicle described in FIG. 1. As will be described in more detail below, the starting system 120 is capable of starting the turbine engine 26, and may be part of or share components with another vehicle system, such as the power steering system 100, the air brakes system 200 (FIG. 4), etc.

As briefly described above, the turbine starting system 120 may be part of or include components of the vehicle's power steering system 100. To that end, one embodiment of the power steering system 100 includes a power steering pump 104 configured to draw fluid from a reservoir 106 and to deliver pressurized fluid to a steering gear 108 via supply line 110, as best shown in FIG. 2. Fluid used by the steering gear 108 is then returned to the reservoir 106 via return line 112. In use, the steering gear 108 controls the steer axle 50 (See FIG. 1) in response to rotation of the steering wheel 82. Two examples of a type of hydraulically assisted steering gear that may be practiced with the present disclosure are Model No. TAS65, commercially available from TRW Automotive, Livonia, Mich., and Model No. M100, commercially available from R. H. Sheppard Company, Hanover, Pa.

In the embodiment shown in FIG. 2, the power steering pump 104 is driven by an electric motor 114. The electric motor 114 may conditionally receive power from a power supply circuit of the power system 98 via the DC/DC bus 96. As will be described in more detail below, the conditions in which the electric motor 114 receives power from the power system 98 can be controlled in response to signals generated by the ignition switch 74, among others.

Still referring to FIG. 2, the turbine starting system in some embodiments further includes a controllable 3-way valve 124 disposed along the supply line 110 between the steering pump 104 and the steering gear 108. Connected to the 3-way valve 124 is a supply line 130 of a turbine starting circuit. The supply line 130 supplies hydraulic fluid to the turbine engine 26 in a suitable manner for starting the turbine engine. In one embodiment, the hydraulic fluid is ejected from a nozzle 134 or the like, which is positioned so as to direct fluid at the turbine shaft in order to impart rotation to the turbine wheel, thereby starting the turbine engine 26. In one embodiment, the ejected hydraulic fluid contacts and imparts rotation onto a set of sealed vanes, which are coupled for rotation with the turbine shaft and/or turbine wheel. At the turbine engine 26, the fluid supplied by supply line 130 can be collected and transferred back to the reservoir 106 via return line 140. In some embodiments, to assist in returning the fluid to the reservoir, an electric pump (not shown) may be employed. Other components may be optionally used, such as one way valve, a filter, etc. (not shown but well known in the art).

In some embodiments, the controllable 3-way valve 124 includes one or more solenoid controlled or other electronically controlled valves that are selectively operated to provide the following conditional fluid delivery paths: (1) pressurized fluid generated by the power steering pump 104 is solely supplied to the steering gear 108; and (2) pressurized fluid from the power steering pump 104 is solely supplied to the turbine engine 26. In that regard, the solenoid of the control valve 124 in one embodiment is configured such that its non-energized state, which can also be referred to as the first position or power steering position of the control valve, couples the power steering pump 104 in fluid communication with the steering gear 108, and decouples the turbine engine 26 from fluid communication with the power steering pump 104. When the solenoid is energized, in response to a control signal, the control valve 124 is switched to a second position or turbine engine start position, in which the power steering pump 104 is coupled in fluid communication with the turbine engine 26 and decoupled from fluid communication with the steering gear 108. It will be appreciated that the control valve 124 can be configured in other embodiments to supply fluid to both the steering gear 108 and the turbine engine 26 when the control valve 124 has attained the second position.

Figure 5:
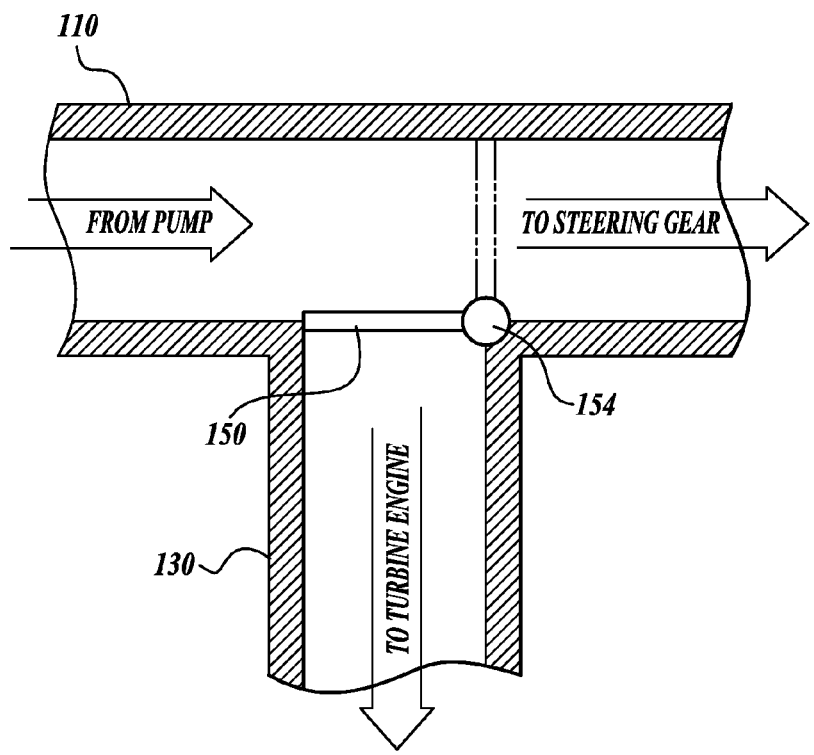
FIG. 5 is a schematic diagram of one example of a control valve suitable for use with the turbine starting systems of FIGS. 2 and 4.

While solenoids have been described herein to actuate the valve, other controllable mechanisms may be utilized in the control valves. For example, the control valve may be configured with a diverter-type valve 150 that switches between the first and second positions described above via operation of a stepper motor and transmission arrangement 154, as best shown in FIG. 5.

Referring back to FIG. 2, the turbine starting system 120 further includes a control system 160 for selectively starting the turbine engine 26. The control system 160 in one embodiment includes a turbine start switch, such as the ignition switch 74, and a controller 164. As best shown in FIG. 2, the controller 164 is electrically connected (e.g., wired or wireless) to the turbine start switch 160. The controller 164 receives start signals from the switch 74, and in response to receiving the start signals from the switch 74, the controller 164 is configured to process such signals and selectively control the operation of the control valve 124 and the steering pump 104 (e.g., via electric motor 114). It will be appreciated that the turbine start switch 74 and the control valve 124 may communicate directly with the controller 164, or may communicate with the controller 164 indirectly via a CAN 168. It will be also appreciated that the controller 164 may communicate with other electronic components of the vehicle 20 via the CAN 168 for carrying out the functionally described herein.

In the representative embodiment of FIG. 2, the control valve 124 includes one or more electronically controllable valves, for controlling the supply of fluid to the turbine engine 26. To that end, the control valve 124 receives appropriate device specific control signals from the controller 164 for selectively supplying the fluid to the steering gear 108 and/or the turbine engine 26. In some embodiments, the control valve 124 switches from the first or power steering position to the second or turbine start position in response to the received control signal. In some embodiments, the control valve 124 switches from the second or turbine start position to the first or power steering position in response to another received control signal. In other embodiments, the control valve 124 is biased to the first or power steering position such that the control valve 124 returns to the first position in response to removal of the first control signal or after a preset length of time.

Figure 3A:
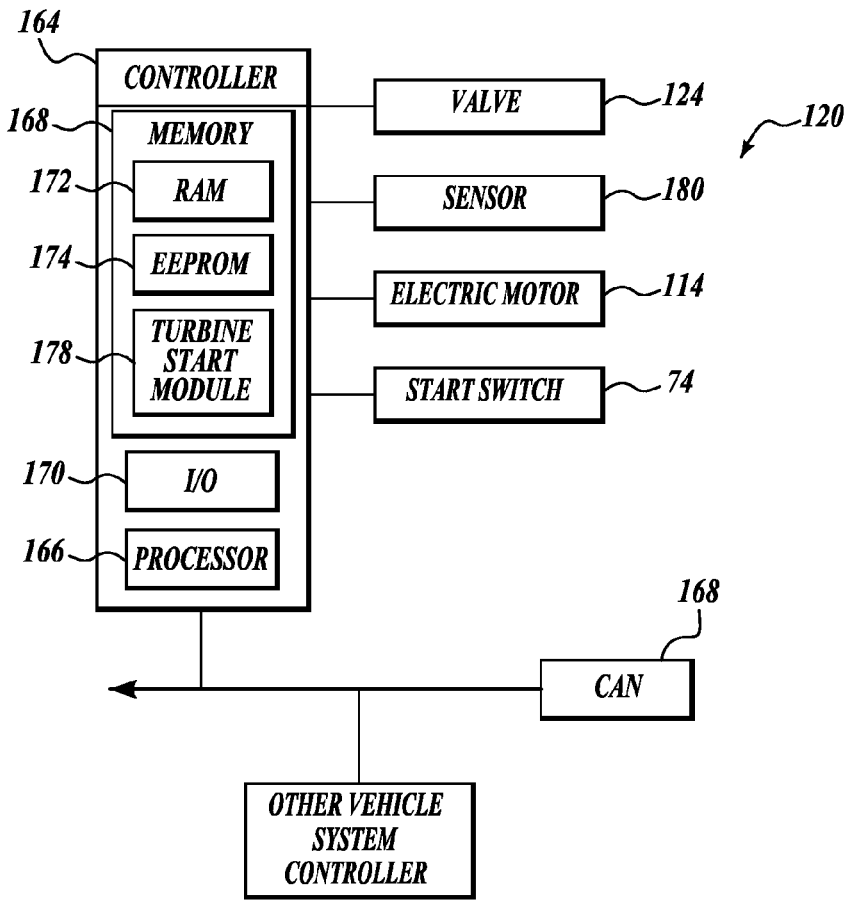
FIGS. 3A and 3B are functional block diagrammatic views of examples of the control system of the turbine starting system of FIG. 2, in accordance with aspects of the present disclosure.

In order to receive the start signals, process such signals, and generate the appropriate device specific control signals, the controller 164 may include a logic system for controlling the operation of, for example, the control valve 124 and the electrically driven steering pump 104. It will be appreciated by one skilled in the art that the logic may be implemented in a variety of configurations, including software, hardware (analog and/or digital), and/or combinations of software and hardware. In one embodiment shown best in FIG. 3A, the controller 164 may include a processor 166, a memory 168, and input/output (I/O) circuitry 170 connected in a conventional manner. As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others.

The memory 168 may include Random Access Memory ("RAM") 172, and an Electronically Erasable, Programmable, Read-Only Memory ("EEPROM") 174, or any other type of digital data storage means. The I/O circuitry 170 may include conventional buffers, drivers, relays, etc., and the like, for sending the device appropriate signals directly or indirectly to the control valve 124. The I/O circuitry 190 may further include conventional buffers, drivers, relays, etc., and the like, for sending the appropriate control signals (i.e., voltage) directly or indirectly to the electric motor 114 in order to operate the steering pump 104. In some embodiments, a controllable clutch (not shown) may be disposed between the electric motor 114 and the steering pump 104 in order to conditionally engage/disengage the driving force of the electric motor 114.

In one embodiment, the processor 166 executes instructions stored in memory 168, such as the turbine start module 178, for selectively starting the turbine engine. The turbine start module 178 may include a set of control algorithms, including resident program instructions and calibrations stored in one of the storage mediums and executed to provide desired functions. Information transfer to and from the turbine start module 178 can be accomplished by way of a direct connection, a local area network bus and a serial peripheral interface bus. In one embodiment, algorithms of the turbine start module 178 may be executed in response to the occurrence of an event, such as turning the turbine start switch 74 from the off to the on position. In some embodiments, the turbine start module 178 includes executable instructions that provide at least the following functionality: 1) receive start signal from ignition switch 74, (2) transmit control signals to control valve 124 to switch the control valve from the first position to the second position in response to receiving the start signal; 3) transmit control signals in order to supply power to electric motor 114 in response to receiving the start signal; and 4) transmit additional control signals to the control valve 124 to switch the control valve from the second position to the first position in response to, for example, signals received from sensor 180. In one embodiment, the sensor 180 can be an engine or transmission speed sensor, a temperature sensor, etc., that outputs data indicative of a successful engine start.

It will be appreciated that the controller 164 may be a separate controller dedicated to the control system 160. However, it will be appreciated that the controller 164 may be a control module or the like, which could be software embedded within an existing on-board controller, such as an engine controller, a general purpose controller, a transmission controller, etc.

In an alternative embodiment, the controller 164 may include a control circuit 188 electrically coupled to the control valve 124 and the electric motor 114. In this example, the control circuit 188 can be an analog circuit and/or digital circuit that is configured to supply power to the electric motor 114, and to supply appropriate control signals (e.g., voltages) to the control valve 124 in order to switch the valve 124 from the first or power steering position, in which the steering gear receives power steering fluid, and the second or turbine start position, in which the turbine receives power steering fluid, in response to operation of the turbine start switch 74. The control circuit 188 may further be configured to return to the control valve to the first position in response to a control signal from, for example, the sensor 180, or after a predetermined length of time.

Figure 4:
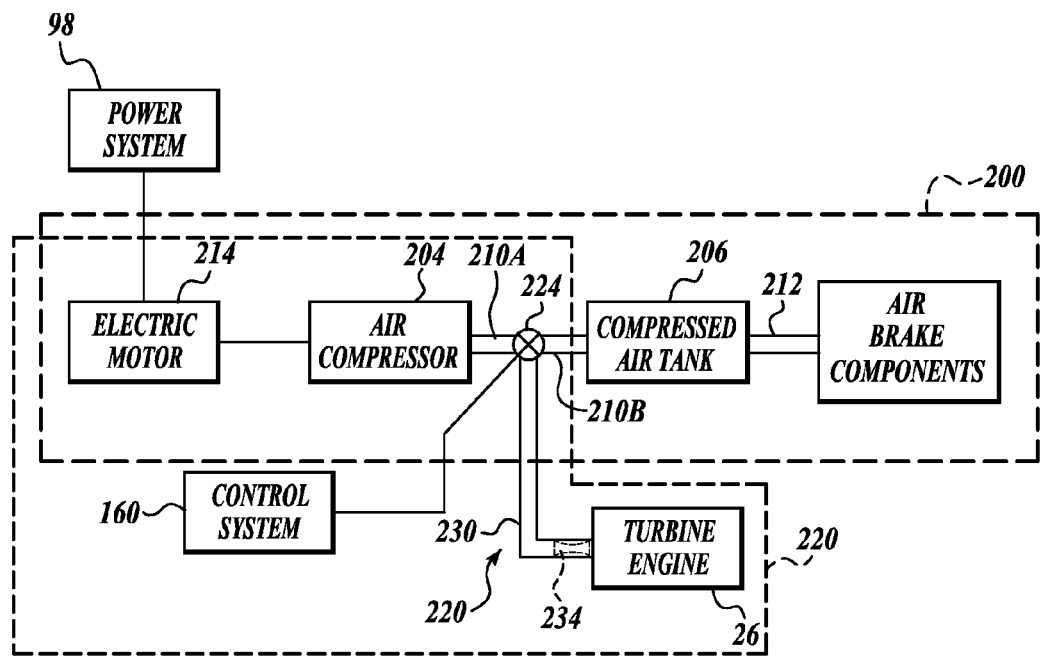
FIG. 4 is a schematic diagram of another embodiment of a turbine starting system formed in accordance with aspects of the present disclosure.

FIG. 4 is a block diagrammatic view of another embodiment of a turbine starting system 220 formed in accordance with aspects of the present disclosure. The turbine starting system 220 is similar in configuration and operation as the turbine starting system 120 of FIG. 2 except for the differences described below. As such, the starting system 220 is also capable of starting the turbine engine 26, and may be part of or share components with another vehicle system, such the air brakes system 200, etc.

As briefly described above, the turbine starting system 220 may be part of or include components of the vehicle's air brakes system 200. To that end, one embodiment of the steering system 200 includes an air compressor 204 configured to draw in air from atmosphere, compress it, and deliver the compressed air to a compressed air tank 206 via supply line 210, as best shown in FIG. 4. Compressed air from the compressed air tank 206 can then be supplied to components of the air brake system 200 via supply line 212 for providing functionality to the service brakes, etc.

In the embodiment shown in FIG. 2, the air compressor 204 is driven by an electric motor 214. The electric motor 214 may conditionally receive power from a power supply circuit of the power system 98. As will be described in more detail below, the conditions in which the electric motor 214 receives power from the power system 98 can be controlled in response to signals generated by the ignition switch 74, among others.

Still referring to FIG. 4, the turbine starting system 220 further includes a controllable 3-way valve 224 disposed along the supply line 210 between the air compressor 204 and the compressed air tank 206. Connected to the 3-way valve 224 is a supply line 230 of a turbine starting circuit. The supply line 230 supplies compressed air to the turbine engine 26 in a suitable manner for starting the turbine engine. In one embodiment, the compressed air is ejected from a nozzle 234 or the like, which is positioned so as to direct air at the turbine wheel in order to impart rotation to the turbine wheel, thereby starting the turbine engine 26. While the valve 224 is disposed along the supply line 210 between the air compressor 204 and the compressed air tank 206 in the embodiment shown in FIG. 4, the valve 224 may be alternatively disposed along the supply line 212 between the compressed air tank 206 and the components of the air brake system 200 (e.g., brake chambers, etc.).

In some embodiments, the controllable 3-way valve 224 includes one or more solenoid controlled or other electronically controlled valves that are selectively operated to provide the following conditional fluid delivery paths: (1) pressurized fluid generated by the air compressor 204 is solely supplied to the compressed air tank 206; (2) pressurized fluid from the air compressor 204 is solely supplied to the turbine engine 26. In that regard, the solenoid of the control valve 124 in one embodiment is configured such that its non-energized state, which can also be referred to as the first position or air brake charging position of the control valve, couples the air compressor 204 in fluid communication with the compressed air tank 206, and decouples the turbine engine 26 from fluid communication with the air compressor 204. When the solenoid is energized, in response to a control signal, the control valve 224 is switched to a second position or turbine engine start position, in which the air compressor 204 is coupled in fluid communication with the turbine engine 26 and decoupled from fluid communication with the compressed air tank 206. It will be appreciated that the control valve 224 can be configured in other embodiments to supply fluid to both the compressed air tank 206 and the turbine engine 26 when the control valve 224 has attained the second position.

While solenoids have been described herein to actuate the valve, other controllable mechanisms may be utilized in the control valves. For example, the control valve 224 may be configured with a diverter-type valve 150 that switches between the first and second positions described above via operation of a stepper motor and transmission arrangement 154, as best shown in FIG. 5.

Referring back to FIG. 2, the turbine starting system 220 further includes a control system, such as control system 160, for selectively starting the turbine engine 26. As described above, the control system 160 in one embodiment includes a turbine start switch, such as the ignition switch 74 and a controller 164. As best shown in FIG. 4, the controller 164 is electrically connected (e.g., wired or wireless) to the turbine start switch 74. In operation, the controller 164 receives start signals from the switch 74, and in response to receiving the start signals from the switch 74, the controller 164 is configured to process such signals and selectively control the operation of the control valve 224 and the air compressor 204 (e.g., via electric motor 214). It will be appreciated that the turbine start switch 74 and the control valve 224 may communicate directly with the controller 164, or may communicate with the controller 164 indirectly via a CAN 168. It will be also appreciated that the controller 164 may communicate with other electronic components of the vehicle 20 via the CAN 168 for carrying out the functionally described herein.

In the representative embodiment of FIG. 4, the control valve 224 includes one or more electronically controllable valves, for controlling the supply of compressed air to the turbine engine 26. To that end, the control valve 224 receives appropriate device specific control signals from the controller 164 for selectively supplying the compressed air to the compressed air tank 206 and/or the turbine engine 26.

Figure 3B:
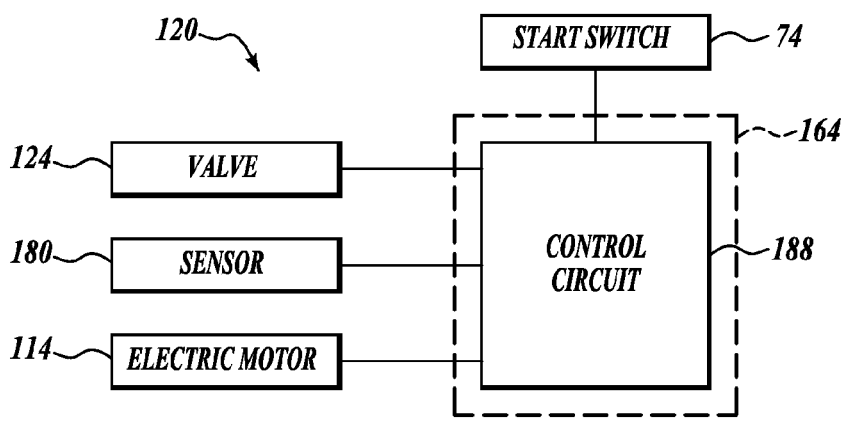

The controller 164 in one embodiment may contain a turbine start module 178, which may include a set of control algorithms, including resident program instructions and calibrations stored in one of the storage mediums and executed to provide desired functions. Information transfer to and from the turbine start module 178 can be accomplished by way of a direct connection, a local area network bus and a serial peripheral interface bus. In one embodiment, algorithms of the turbine start module 178 may be executed in response to the occurrence of an event, such as turning the turbine start switch 74 from the off to the on position. In some embodiments, the turbine start module 178 includes executable instructions that provide at least the following functionality: 1) receive start signal from ignition switch 74, (2) transmit control signals to control valve 224 to switch from the first position to the second position in response to receiving the start signal; 3) transmit control signals in order to supply power to electric motor 214 in response to receiving the start signal; and 4) transmit additional control signals to the control valve 224 to switch from the second position to the first position in response to, for example, signals received from sensor 180. Similar to the embodiment of FIG. 3B, the controller 164 may include an analog and/or digital control circuit that carries out the logic described above.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defines as follows:

1. A vehicle, comprising:
   a turbine engine;
   a steering system including an electrically driven steering pump and a steering gear;
   a fluid circuit coupled to the electrically driven steering pump and receiving a fluid therefrom, the fluid circuit further coupled to the steering gear and the turbine engine for supplying fluid thereto; and
   a control valve coupled to the fluid circuit, the control valve configured to selectively direct fluid from the electrically driven steering pump to either the steering gear or the turbine engine in response to a control signal, wherein the control valve has a first position, in which the electrically driven steering pump is coupled in fluid communication with the steering gear, and a second position, in which the electrically driven steering pump is coupled in fluid communication with the turbine engine; and
   a controller and a start switch, wherein the controller is configured to control the control valve in response to output of the start switch.

2. The vehicle of claim 1, wherein the control valve switches from the first position to the second position in response to a first control signal.

3. The vehicle of claim 2, wherein the control valve returns to the first position from the second position in response to a second control signal.

4. The vehicle of claim 3, wherein the second control signal is transmitted to the control valve in response to a turbine engine start condition.

5. The vehicle of claim 1, wherein the controller includes a control circuit.

6. The vehicle of claim 1, wherein the controller includes a processor and memory having programmable instructions stored thereon, wherein the processor is configured to execute the programmable instructions stored in memory in order to control the control valve in response to output of the start switch.

7. A vehicle, comprising:
   a turbine engine;
   a brake system including an electrically driven gas compressor and a compressed gas tank;
   a gas circuit coupled to the electrically driven gas compressor and receiving a gas therefrom, the gas circuit further coupled to the compressed gas tank and the turbine engine for supplying fluid thereto;
   a control valve coupled to the gas circuit, the control valve configured to selectively direct gas from the electrically driven gas compressor to either the compressed gas tank or the turbine engine in response to a control signal; and
   a controller and a start switch, wherein the controller is configured to control the control valve in response to output of the start switch, wherein the controller includes a processor and memory having programmable instructions stored thereon, wherein the processor is configured to execute the programmable instructions stored in memory in order to control the control valve in response to output of the start switch.

8. The vehicle of claim 7, wherein the control valve has a first position, in which the electrically driven gas compressor is coupled in fluid communication with the compressed gas tank, and a second position, in which the electrically driven gas compressor is coupled in fluid communication with the turbine engine, and wherein the control valve switches from the first position to the second position in response to the control signal.

9. A vehicle, comprising:
a turbine engine;
an accessory system including an electric means for forcing a fluid and an accessory component;
a fluid circuit coupled to the electric means for forcing a fluid, the fluid circuit further coupled to the turbine engine and the accessory component for supplying fluid thereto; and
a control valve coupled to the fluid circuit, the control valve having a first position configured to direct fluid from the electric means for forcing a fluid to the turbine engine and a second position configured to direct fluid from the electric means for forcing a fluid to the accessory component; and
a controller configured to transition the control valve from the first position to the second position; and
a power source conditionally coupled in electrical communication with the electric means for forcing a fluid, wherein the controller is configured to control the supply of power from the power source to the electric means for forcing a fluid.

10. The vehicle of claim 9, wherein the controller is configured to transition the control valve from the second position to the first position.

11. The vehicle of claim 9, further comprising a start switch, wherein the controller is configured to transition the control valve from the first position to the second position based on the output of the start switch.

12. The vehicle of claim 9, wherein the accessory component includes a compressed air tank.

13. The vehicle of claim 9, wherein the accessory component includes one of an air brake and a steering gear.

14. The vehicle of claim 9, wherein the electric means for forcing a fluid includes one of a pump and a compressor.

* * * * *